US005706167A

United States Patent [19]
Lee

[11] Patent Number: 5,706,167
[45] Date of Patent: Jan. 6, 1998

[54] PORTABLE COMPUTER WITH SEPARABLE KEYBOARD WHICH MOVES IN RESPONSE TO MOVEMENT OF A DISPLAY UNIT

[75] Inventor: Jin-Hyup Lee, Kyungki-do, Rep. of Korea

[73] Assignee: SamSung Electronics Co., Ltd., Suwon, Rep. of Korea

[21] Appl. No.: 683,690

[22] Filed: Jul. 18, 1996

[30] Foreign Application Priority Data

Oct. 6, 1995 [KR] Rep. of Korea .................. 34295/95

[51] Int. Cl.⁶ ...................... G06F 1/16; B41J 11/56; H05K 5/02
[52] U.S. Cl. ...................... 361/680; 400/682
[58] Field of Search .................. 341/22; 364/708.1; 400/82, 489, 682, 691; 345/168, 169, 905; 361/680

[56] References Cited

U.S. PATENT DOCUMENTS

| | | | |
|---|---|---|---|
| 4,661,005 | 4/1987 | Lahr | 400/489 |
| 5,067,834 | 11/1991 | Szmanda et al. | 400/489 |
| 5,187,644 | 2/1993 | Crisan | 361/680 |
| 5,198,991 | 3/1993 | Pollitt | 361/680 |
| 5,267,127 | 11/1993 | Pollitt | 361/680 |
| 5,278,779 | 1/1994 | Conway et al. | 364/708.1 |
| 5,454,652 | 10/1995 | Huellemeier et al. | 400/689 |
| 5,457,452 | 10/1995 | Skovronski | 341/22 |
| 5,490,037 | 2/1996 | Clancy | 361/680 |
| 5,502,460 | 3/1996 | Bowen | 400/489 X |
| 5,532,904 | 7/1996 | Sellers | 361/680 |
| 5,543,787 | 8/1996 | Karidis et al. | 361/680 X |
| 5,596,480 | 1/1997 | Manser et al. | 361/680 |
| 5,612,691 | 3/1997 | Murmann et al. | 341/22 |
| 5,613,786 | 3/1997 | Howell et al. | 400/489 |
| 5,615,081 | 3/1997 | Ma | 361/680 |

*Primary Examiner*—Michael W. Phillips
*Attorney, Agent, or Firm*—Robert E. Bushnell, Esq.

[57] ABSTRACT

A portable notebook computer having an ergonomically designed keyboard made up of two rotatably separable keyboard sections. Upon opening up the lid of the notebook computer, the user may manually rotate the keyboard sections apart to a desired angle. When the user is finished working on the notebook computer, the user folds the lid onto the main body of the computer. While the lid is being closed, the separated sections of the keyboard are automatically driven together in response to the user closing the lid. Thus, the user is not required to make an additional maneuver of rotating the keyboard sections together.

19 Claims, 3 Drawing Sheets

PORTABLE COMPUTER WITH SEPARABLE KEYBOARD WHICH MOVES IN RESPONSE TO MOVEMENT OF A DISPLAY UNIT

CROSS REFERENCE TO RELATED APPLICATION

This application makes reference to, incorporates the same herein, and claims all benefits accruing under 35 U.S.C. §119 arising from an application for a Portable Computer with Separable Keyboard earlier filed in the Korean Industrial Property Office on 6 Oct. 1995 and there duly assigned Ser. No. 34295/1995.

FIELD OF THE INVENTION

The present invention relates to a portable computer having an ergonomically adjustable keyboard that rotatably separates to a desired angle. In addition, this invention is about a keyboard that can automatically rotate from a spread position back to a joined position in response to the closing of a display containing lid onto the main body.

BACKGROUND OF THE INVENTION

Conventionally, a keyboard of the notebook computer has been fixed onto a main body. However, as there has been an increasing interest in adapting keyboards to the human body. The ergonomic keyboard is designed and installed such that use of the computer, even for long periods, does not over strain the body, including the wrists and the shoulders.

There are numerous examples of keyboards that can be adjusted for ergonomic reasons. For example, U.S. Pat. No. 5,278,779 for a Laptop Computer with Hinged Keyboard to Conway et al. discloses several embodiments in which keyboards and displays are folded on to each other. This allows for an expanded keyboard for the user when in use so that there is less physical strain on the user while having a convenient and efficient storage mechanism for the keyboard. Another example is found in U.S. Pat. No. 5,457,452 for a Split Keyboard Adjustment System to Skovronski which discloses an apparatus for adjusting a split keyboard about all three axes to enable a user to be more comfortable when using the keyboard. U.S. Pat. No. 5,067,834 for an Input Keyboard Apparatus for Information Processing Device and Other Keyboard Devices to Szmanda et al. discloses a separable keyboard that is adjustable along more than one axis.

Other designs include U.S. Pat. No. 5,454,652 for an Adjustable Keyboard to Huellemeier et al. which discloses a keyboard that pivots apart. The keyboard is divided into two sections. Each half is monolithically attached to a pivot in the rear center corner. The rear, exterior corner of each half rotates backwards. As there are an infinite amount of angles possible, the keyboard sections are not restricted to opening to a predetermined angle. To rotate the keyboards apart, the user twists a knob.

I have discovered that the conventional separable keyboard has a drawback in that when the user, in a state where the keyboard is spread, intends to return the spread keyboard to the initial closed position to finish his/her work, it is troublesome for the user to manipulate the separated keyboard to the initial closed position. For the foregoing reasons, I have found that there is a need for a device which can automatically return the keyboard from a spread position to an initial closed position while folding a display unit over a main body.

Ergonomic keyboard features operate in response to the opening or closing of a display lid. For example, U.S. Pat. No. 5,490,037 for a Flexing Keyboard Structure for a Notebook Computer to Clancy discloses a flexing keyboard. The keyboard is capable of being flexed or bowed to form a convex user interface. The flexible keyboard feature is linked with the lid of the notebook computer so that when the lid closes, the flexing automatically stops and the keyboard returns to a flat topography. Upon opening of the lid, the keyboard automatically returns to a convex topography. A hinge joint and a gear, located along where the display screen is joined to the keyboard, provides the interconnecting mechanism for this automated feature. Another example is in U.S. Pat. No. 5,502,460 for an Ergonomic Laptop Computer and Ergonomic Keyboard to Bowen which describes a slidably separable keyboard for a laptop computer. Several embodiments are disclosed. One embodiment slidably separates the keyboard, another embodiment folds the keyboard open or closed. In the space left between the keyboards could be a mouse or a display unit.

Although the art as evidenced by the foregoing references, has made some effort to provide a portable computer that makes ergonomic adjustments to the keyboard in response to the opening and closing of a display containing lid, I have discovered a need for a portable computer that automatically rotates two separated keyboard sections together in response to either the opening or the closing of a display containing lid onto a main body.

SUMMARY OF THE INVENTION

It is therefore an object to provide a personal computer with separable keyboard sections that automatically dose so as to be adjacent to each other when the display containing lid is folded onto the main body.

It is also an object to provide a keyboard for a notebook computer, made up of two keyboard sections that can be manually separated from each other to any desired angle extending over a continuum of angles within a range when the display containing lid is opened up.

It is yet another object to provide a rotatably separable keyboard for a notebook computer that automatically closes in response to the closing of the display containing lid.

These and other objects may be achieved by a notebook computer having a main body, a keyboard separable into two sections located on the main body, a lid housing pivotally attached to the rear side of the main body so as to be able to fold over the main body by its rotating movement, a hinge shaft for connecting the main body and the display unit to each other and for rotating with the rotating movement of the display unit, and a linkage mechanism interconnecting the lid housing to the separable keyboard, so that the two sections of the keyboard rotate to a closed position adjacent to each other whenever the lid housing is folded over onto the main body.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
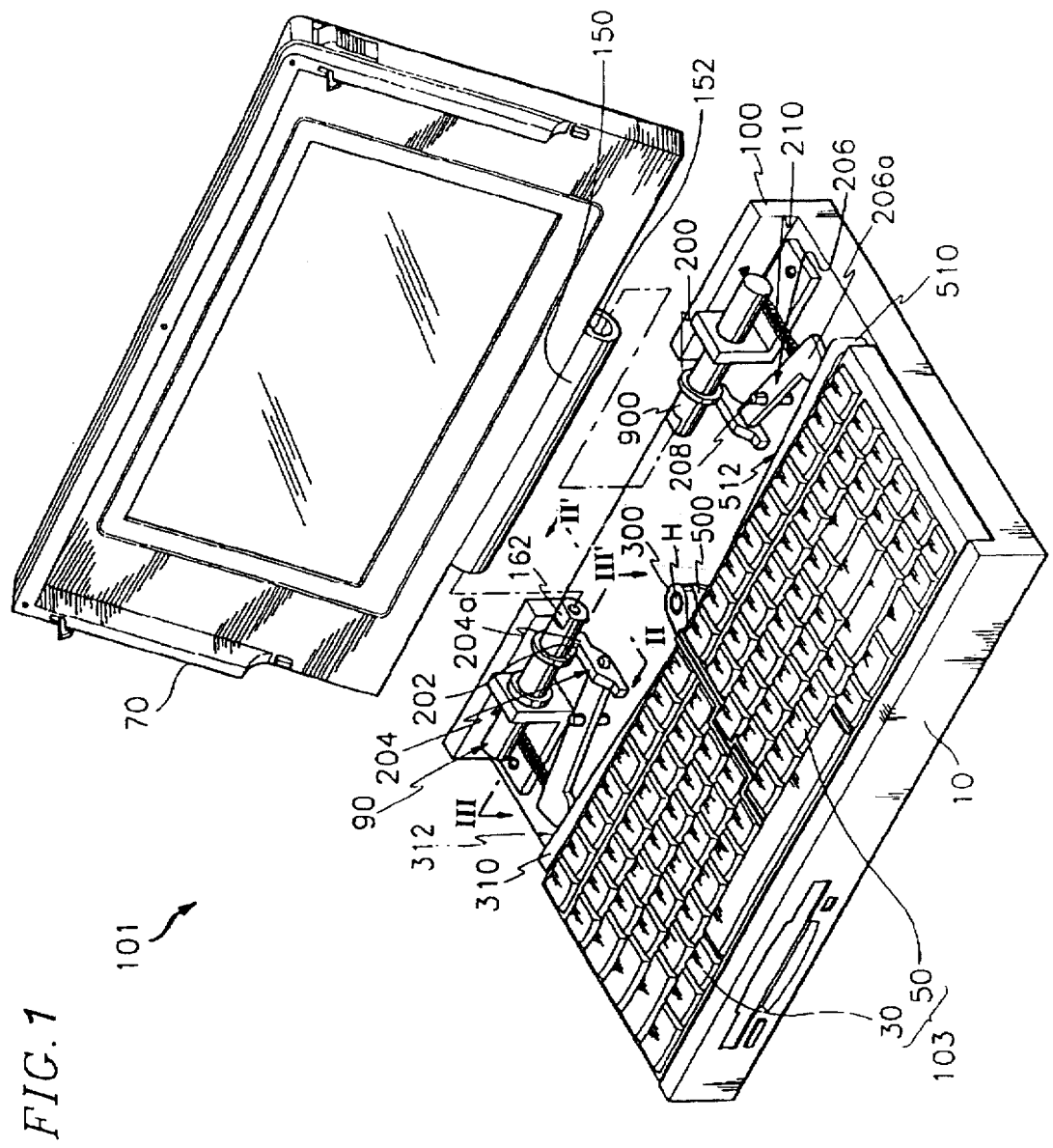
FIG. 1 is a perspective view showing the portable computer of the present invention where the lid is removed from the base housing for clarity, showing the keyboard sections, the hinge mechanism, and the shafts in the closed position.

Referring to FIG. 1, a portable computer 101 includes main body 10 having keyboard 103, lid 70 pivotally mounted to the rear side of main body 10 by hinge assembly 90 so that lid 70 can be folded over onto keyboard 103 of main body 10. Main body 10 is essentially a base housing for portable computer 101. Main body 10 contains a disk drive, a power supply, memory, a microprocessor, and maybe a modem. Lid 70 contains a display unit that is visible to the user when lid 70 is rotated open from main body 10. Keyboard 103 is divided into left and right keyboard sections 30 and 50 respectively which are separable from each other at an angle desired by the user. Coupling projection 300 pivotally attaches the right rear corner of left keyboard section 30 to hinge H. Similarly, coupling projection 500 pivotally attaches the left rear corner of right keyboard section 50 to hinge H. That is, in one corner of each keyboard section, a coupling projection is formed for insertion of a hinge axis H formed on main body 10 between keyboard 103 and rear wall 100 on the top side of main body 10. Each keyboard section is spreadable about hinge axis H.

Portable computer 101 further comprises a pair of linkage mechanisms which can automatically cause keyboard sections 30 and 50 to rotate back to their initial closed positions shown in FIG. 1 from their separated positions in response to the closing of lid 70 over main body 10. One linkage mechanism is provided for each keyboard section. Each linkage section operates by pushing the back edge of each keyboard section closed while lid 70 is folded over main body 10. One linkage mechanism pushes back edge 312 of left wedge 310 of left keyboard section 30 while the other linkage mechanism pushes back edge 512 of right wedge 510 of right keyboard section 50, causing the two keyboard sections to rotate towards each other simultaneously and into juxtaposition about hinge axis H. The linkage mechanism that pushes the respective keyboard sections to return to their initial, closed position is the same for both the left and the right sections. Therefore, in this description, only the left linkage mechanism will be described hereinbelow.

According to the present invention, a linkage mechanism includes through hole plate 200 into which hinge shaft 900 of hinge assembly 90 is inserted. Plate 200 is provided with projection 202 on the interior side and is fixably attached to rotating hinge shaft 900. Under plate 200, elongated member 204 having vertical portion 204a engageable with projection 202 of plate 200 on hinge shaft 900 is included. The linkage mechanism also includes lever 206, which is pivotally attached to shaft 208 protruding upwardly from main body 10. Lever 206 has a first end on which pressure portion 206a is formed to push against back edge 312 of left keyboard section 30. Lever 206 has a second end 206b which is fitted on member 204. Elastic member 210 is connected between rear wall 100 of main body 10 and pressure portion 206a of lever 206. Elastic member 210 biases the linkage mechanism so that pressure portion 206a of lever 206 rotates back towards rear wall 100 and second end 206b of lever 206 rotates forward away from rear wall 100, causing member 204 to be displaced forward away from rear wall 100. Projection 202 enables the linkage mechanism to oppose this bias of elastic member 210 by engaging with vertical portion 204a of member 204 and sliding member 204 back towards rear wall 10 when lid 70 is rotated to a closed position over main body 10. As a result, lever 206 pivots about lever pivot 208 causing pressure portion 206a to drive keyboard section 30 closed towards, and in juxtaposition with keyboard section 50.

Figure 2A:
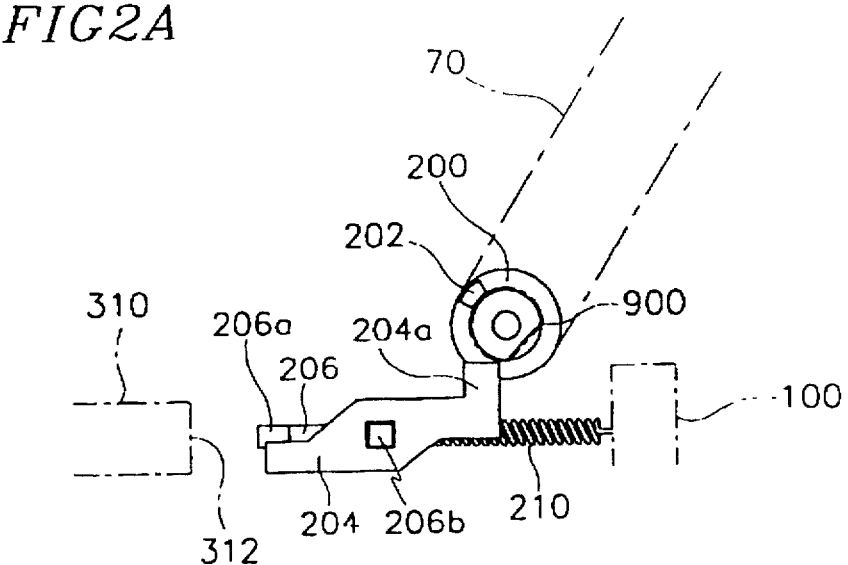
FIG. 2A is a cross sectional view of FIG. 1 taken along line II—II', showing the left linkage mechanism and left hinge mechanism when the lid is in an open position.
Figure 2B:
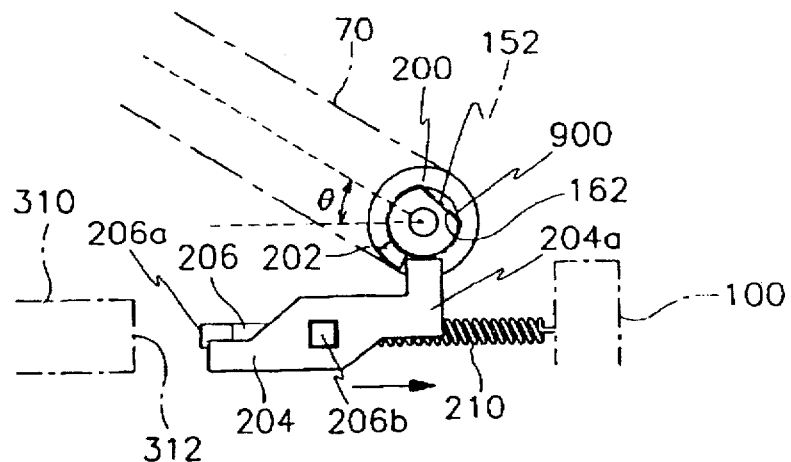
FIG. 2B is a cross sectional view of FIG. 1 taken along line II—II', showing the left linkage mechanism and left hinge mechanism when the lid is in between an open and a closed position.

The operation of the device will now be described. Since the operation of each linkage mechanism and each keyboard section is identical, only the operation of the left linkage mechanism and left keyboard section 30 will be described. FIGS. 2A–3B show in detail how the linkage mechanism cause the keyboard sections to rotate together in response to the closing of lid 70. When lid 70 is opened so that notebook computer 101 can be used by a user, hollow shaft 150 integrated to lid 70 also rotates open. Land 152 inside hollow shaft 150 of lid 70 engages with land 162 of hinge shaft 900 causing projection 202, located on hinge shaft 900, to rotate with display lid 70. Similarly, when lid 70 is closed onto main body 10, land 152 in hollow shaft 150 rotates land 162 of hinge shaft 900 causing projection 202 to rotate with lid 70 as shown in FIGS. 2A through 2C.

When the user is finished with his work on notebook computer 101, the user rotates lid 70, intending to fold lid 70 over main body 10. This rotation of lid 70 causes hinge shaft 900, through hole plate 200, and projection 202 to rotate with lid 70, causing projection 202 to make contact with and push vertical portion 204a of member 204 so as to oppose the bias of elastic member 210 as shown in FIG. 2B. Contact is made between projection 202 and vertical portion 204a of member 204 when the angle between the center line of the lid 70 and the horizontal line is less than 60 degrees. See FIG. 2B.

Figure 2C:
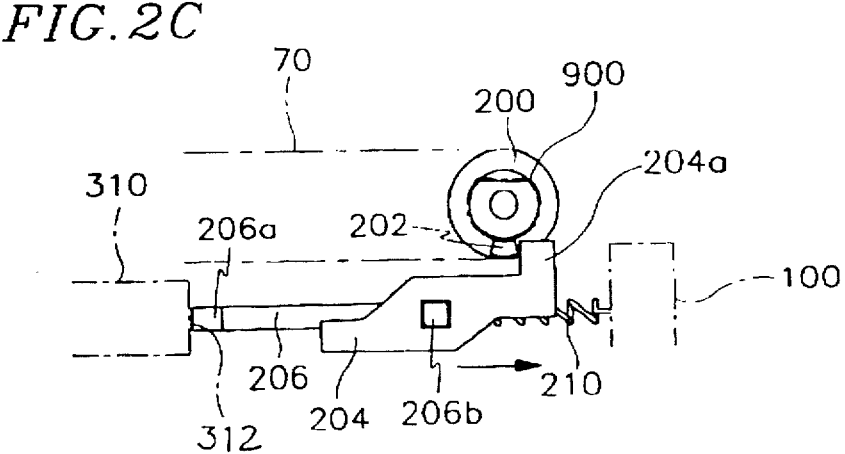
FIG. 2C is a cross sectional view of FIG. 1 taken along line II—II', showing the left linkage mechanism and left hinge mechanism when the lid is in a closed position.
Figure 3A:
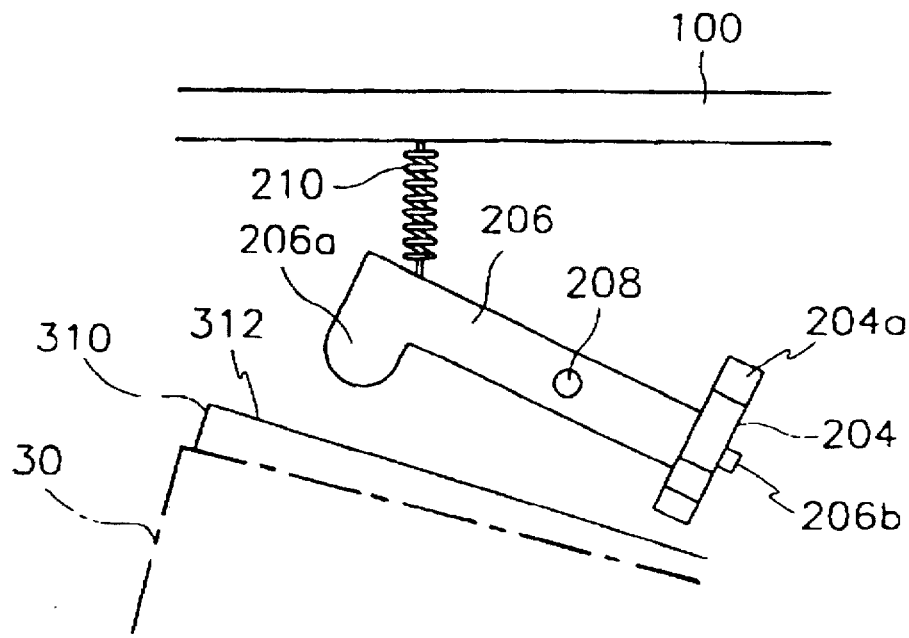
FIG. 3A is a cross sectional view of FIG. 1 taken along line IV—IV' showing the left linkage mechanism when the lid is in an open position and when the keyboard sections have been rotated apart from each other.
Figure 3B:
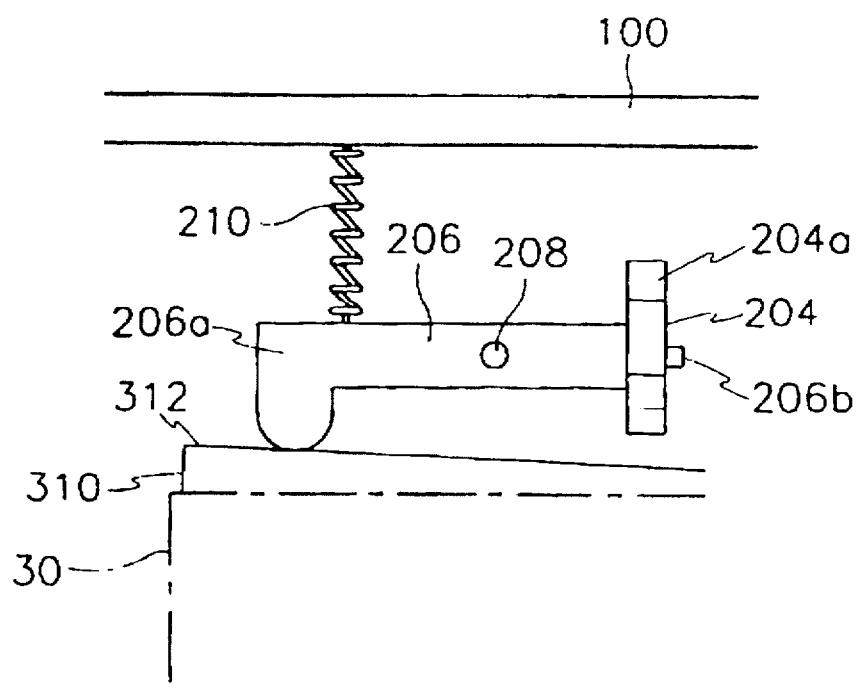
FIG. 3B is a cross sectional view of FIG. 1 taken along line IV—IV' showing the left linkage mechanism when the lid is in a closed position.

If the user continues to close lid 70 onto main body 10, projection 202 pushes vertical portion 204a of member 204 against the bias of elastic member 210 and towards rear wall 100 as shown in FIGS. 2C and 3B. As member 204 is linearly displaced toward the rear, lever 206, cooperating with member 204, rotates about lever pivot 208 causing pressure portion 206a on lever 206 to drive back edge 312 of left rear wedge 310 of left keyboard section 30 closed, overcoming the elastic force of elastic member 210. See FIGS. 2C and 3B. Thus, the user does not have to rotate keyboard sections 30 and 50 closed when finished working, because the linkage mechanism, in response to the user closing lid 70, accomplishes this task automatically.

Meanwhile, when the user opens lid 70 intending to use notebook computer 101 again, projection 202, which is in contact with vertical portion 204a, separates from vertical portion 204a, as hinge shaft 900, through hole plate 200, and projection 202 rotate together to the open position. This separation occurs when the angle between the center line of lid 70 and the horizontal line is less than 60 degrees. This separation of projection 202 from vertical portion 204a causes lever 206 to rotate with the bias of elastic member 210 about rotating shaft 208, causing second end 206b of lever 206, along with member 204, to move away from rear wall 100 of main body 10, and causing pressure portion 206a of lever 206 to move towards rear wall 100 of main body 10 and away from back edge 312 of left wedge 310 of left keyboard section 30. Thus, pressure portion 206a of lever 206 is separated from back edge 312 of left keyboard 30, allowing a user to manually rotate keyboard section 30 away from keyboard section 50 to form a desired angle with keyboard section 50.

While this invention has been described in connection with what is presently considered to be the most practical and preferred embodiments, it is to be understood that the invention is not limited to the disclosed embodiment, but, on the contrary, it is intended to cover various modifications and equivalent arrangements included within the spirit and scope of the appended claims.

What is claimed is:

1. A portable computer, comprising:
    a base housing a central processing unit, said base having a top side, a bottom side, and opposing front and rear sides;
    a lid containing a display unit mounted on the underside of said lid and driven by said central processing unit to provide variable visual video displays, said lid being pivotally attached to said rear side of said base;
    two rotatably separable sections of a keyboard disposed on said top side of said base deployable into a plurality of positions mutually angularly displaced from juxtaposition; and
    linkage means driven by rotation of said lid relative to said base to drive said two separable sections of said keyboard into said juxtaposition simultaneous to the closing of said lid onto said base.

2. The portable computer of claim 1, wherein said two rotatably separable sections of said keyboard separate from each other about a single pivot.

3. The portable computer of claim 2, wherein said pivot is disposed on the top side of said base between said two rotatably separable sections of said keyboard and said rear side of said base.

4. The portable computer of claim 1, wherein said two rotatably separable sections of said keyboard can be manually separated to an infinite number of angles.

5. A portable computer, comprising:
    a base housing a central processing unit, said base having a top side, bottom side, front side, and a rear side, said rear side opposite to said top side;
    a lid containing a display unit mounted on the underside of said lid and driven by said central processing unit to provide variable visual video displays, said lid having a top side and a bottom side, said lid is pivotally attached to said rear side of said base housing, said bottom side of said lid folds onto said top side of said base housing when said lid is pivoted to a closed position, and said lid opens up from said base housing exposing a display unit on said bottom side of said lid when said lid is pivoted to an open position;
    a separable keyboard disposed on said top side of said base housing, said separable keyboard is comprised of two separable keyboard sections; and
    linkage means interconnecting said lid to said separable keyboard on said base housing, said linkage means driving said two separable keyboard sections into juxtaposition in response to pivoting said lid to said closed position.

6. The portable computer of claim 5, wherein each of said two separable keyboard sections are connected to a keyboard pivot allowing a user to manually rotate said two separable keyboard sections apart after said lid is pivoted to said open position.

7. The portable computer of claim 6, wherein said keyboard pivot is located on the top side of said base between said two separable keyboard sections and said rear side of said base.

8. The portable computer of claim 5, wherein said linkage means comprises:
    a pair of resilient elements connected between said linkage means and said rear side of said base for biasing said linkage means to allow said two separable keyboard sections to be manually separated from each other;
    a pair of levers, each pivotally attached at the center to a lever pivot, each lever having first end and a second end, each said first end attached to corresponding ones of said pair of resilient elements;
    a pair of elongated connecting members, each having a first end and a second end, each said first ends connected to corresponding ones of said second ends of said pair of levers; and
    a pair of hinge shafts for pivotally connecting said base to said lid, each one of said pair of hinge shafts contains a protrusion extending radially from said hinge shaft and rotates with said hinge shaft when said lid is being pivoted, causing said two separable keyboard sections to be driven towards each other when said lid is pivoted to said closed position.

9. A portable computer, comprising:
    a main body housing a central processing unit, said main body having a bottom side, a top side, and a front side and a rear side;
    a lid containing a display unit mounted on the underside of said lid and driven by said central processing unit to provide variable visual video displays, said lid pivotally attached to said rear side of said main body so that said lid can rotate onto said main body into a closed position as well as rotate open into an open position;
    a pair of hinge shales that pivotally connect said main body to said lid, each said hinge shaft containing a protrusion that extends radially from said hinge shaft, said protrusion rotates with said shaft when said lid rotates between said open position and said closed position;
    a pair of separable keyboard sections located on said top side of said main body, each said pair of separable keyboard sections being pivotally connected to a keyboard pivot located between said pair of separable keyboard sections near said rear side of said main body; and
    linkage means for interconnecting said pair of separable keyboard sections to said lid, said pair of separable keyboard sections rotate together so as to be adjacent to each other in response to pivoting said lid to said closed position.

10. The portable computer of claim 9, where said linkage means comprises:
    a pair of elongated members, each containing a vertical protrusion that extends vertically from each said member, each said vertical protrusion engages with a corresponding one of said protrusions that extend radially from said pair of hinge shafts, causing said elongated member to translate in response to the rotating of said display unit;

a pair of levers, the center of each is pivotally attached to a lever pivot fixedly attached to said top side of said main body, each said lever having a first end and a second end, each said second end attached to a corresponding one of said pair of elongated members at a location distal from said vertical protrusion; and a pair of elastic members, each connecting said first end of a corresponding one of said pair of levers to said rear side of said main body.

11. The portable keyboard of claim 10, wherein said linkage means opposes a biasing force of said pair of elastic members when said display unit is rotated to said closed position.

12. The portable computer of claim 11, where said pair of separable keyboard sections may be manually spread apart to a desired angle when said lid is in said open position.

13. The portable computer of claim 12, wherein each of said first ends of said pair of lever members are automatically detached from corresponding ones of said pair of separable keyboard sections when said display unit rotated to said open position, allowing said pair of separable keyboard sections to be manually spread apart to an infinite number of angles.

14. The portable computer of claim 12, wherein each of said first ends of said pair of lever members are in contact with corresponding ones of said pair of separable keyboard sections when said lid is in said closed position.

15. A method of using a portable computer having a spreadable keyboard, said method comprising the steps of:

manually opening a display unit at a predetermined angle;

spreading said keyboard to any desired position within a continuum of positions extending over a range of spread positions; and returning said keyboard from said desired position to an unspread position by releasing a spring bias while folding said display unit closed onto said keyboard.

16. The method of claim 15, further comprised of automatically returning said keyboard from said one of said plurality of discrete positions by folding said display unit closed onto said keyboard.

17. A portable computer, comprising:

a base for providing a housing for a disk drive, a power supply, a modem, a microprocessor, and a memory, said base having a top side, a bottom side, a front edge, a back edge, a right side, and a left side;

a keyboard positioned on said top side of said base, said keyboard comprised of two separable keyboard sections, each said keyboard half pivotally attached to a single keyboard pivot mounted on said top side of said base between said two keyboard sections and near said back edge of said base;

a pair of hinges mounted on said top side of said base along said back edge of said base;

a lid, pivotally attached to said pair of hinges to rotate said lid to an open position and a closed position with respect to said base; and a linkage mounted on said top side of said base along said back edge of said base, said linkage comprising:

said pair of hinges pivotally connecting said base to said lid, each one of said pair of hinges containing a first protrusion extending radially from said hinge and rotating with said hinge when said lid rotates between said open position and said closed position, a pair of levers, the center of each attached to a corresponding lever pivot mounted on said top side of said base, each said lever having first and second ends, a pair of resilient elements, each one of said pair of resilient elements connecting a first end of a corresponding one of said pair of levers to said back edge of said base, and a pair of elongated connecting members, each having first and second ends, each of said first ends being connected to corresponding ones of said second ends of said pair of levers, each of said second ends containing a second protrusion that engages with a first protrusion on a corresponding one of said pair of hinges when said lid is rotated to a closed position, resulting in each of said second ends of said pair of levers to rotate a corresponding one of said two separable keyboard sections towards the other of the two separable keyboard sections.

18. The portable computer of claim 17 where said two separable keyboard sections are manually rotated when said lid is in said open position.

19. The portable computer of claim 18 where said two separable keyboard sections remain stationary absent external force by a user when said lid is in said open position.

* * * * *